US008955633B2

(12) United States Patent
Nakamura et al.

(10) Patent No.: US 8,955,633 B2
(45) Date of Patent: Feb. 17, 2015

(54) TWO-WHEELED MOTOR VEHICLE (75) Inventors: Hironori Nakamura, Wako (JP); Taisuke Nimura, Wako (JP); Akihiro Nakajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/122,358

(22) PCT Filed: May 25, 2012

(86) PCT No.: PCT/JP2012/063486
§ 371 (c)(1),
(2), (4) Date: Nov. 26, 2013

(87) PCT Pub. No.: WO2012/165332
PCT Pub. Date: Dec. 6, 2012

(65) Prior Publication Data
US 2014/0084565 A1    Mar. 27, 2014

(30) Foreign Application Priority Data

May 31, 2011    (JP) .................................. 2011-122832

(51) Int. Cl.
*B62D 61/02*    (2006.01)
*B62K 25/20*    (2006.01)
(Continued)

(52) U.S. Cl.
CPC ............... *B62K 25/20* (2013.01); *B62K 25/283* (2013.01); *B62K 25/286* (2013.01); *F16F 9/065* (2013.01); *B62K 11/00* (2013.01); *B62K 2025/048* (2013.01)
USPC ..... 180/227; 188/319.1; 188/318; 188/322.2; 188/322.21

(58) Field of Classification Search
USPC ........ 180/227; 188/319.1, 318, 322.2, 322.21
See application file for complete search history.

(56) References Cited

U.S. PATENT DOCUMENTS 4,732,244 A * 3/1988 Verkuylen ..................... 188/318
6,029,958 A * 2/2000 Larsson et al. ................ 267/113
(Continued)

FOREIGN PATENT DOCUMENTS

EP    1 514 787    3/2005
EP    1 816 063    8/2007
(Continued)

OTHER PUBLICATIONS

International Search Report, Date of mailing: Aug. 14, 2012.
(Continued)

*Primary Examiner* — Joseph Rocca
*Assistant Examiner* — Marlon Arce
(74) *Attorney, Agent, or Firm* — Rankin, Hill & Clark LLP (57) ABSTRACT

A two-wheeled motor vehicle has a rear cushion unit that includes a damper cylinder having one end part linked to a swing arm, a sub-tank connected to the damper cylinder and an adjustment mechanism for adjusting a damping force in response to operation of the operation element is provided between a vehicle body frame and the swing arm. A cylinder body of the damper cylinder, a bottomed housing tube part housing the adjustment mechanism having on an upper end part an operation face on which the operation element is disposed, and the sub-tank are integrally and connectedly provided. The operation face is inclined obliquely upward so that the operation element that faces a region bounded by the seat frame, the pillion step holder mounted on the seat frame and the swing arm when viewed from the side can be operated from obliquely above on the outside.

10 Claims, 9 Drawing Sheets (51) Int. Cl.
  *B62K 25/28*  (2006.01)
  *F16F 9/06*   (2006.01)
  *B62K 11/00*  (2006.01)
  *B62K 25/04*  (2006.01)

(56) References Cited

U.S. PATENT DOCUMENTS

| | | | |
|---|---|---|---|
| 7,178,620 B2* | 2/2007 | Toyoda | 180/227 |
| 7,472,772 B2* | 1/2009 | Ozeki | 180/218 |
| 7,513,490 B2* | 4/2009 | Robertson | 267/64.15 |
| 7,870,924 B2* | 1/2011 | Fujita et al. | 180/227 |
| 7,913,793 B2* | 3/2011 | Kofuji | 180/226 |
| 7,963,359 B2* | 6/2011 | Fujita | 180/227 |
| RE44,609 E* | 11/2013 | Robertson | 267/64.15 |
| 2002/0027035 A1* | 3/2002 | Gogo | 180/227 |
| 2009/0058030 A1 | 3/2009 | Fujita et al. | |
| 2011/0073063 A1* | 3/2011 | Tadokoro et al. | 123/195 C |

FOREIGN PATENT DOCUMENTS

| | | |
|---|---|---|
| JP | 59-19492 | 2/1984 |
| JP | 07208529 | 8/1995 |
| JP | 2001071979 | 3/2001 |
| JP | 2005-082040 | 3/2005 |
| JP | 2005162004 | 6/2005 |
| JP | 2009220782 | 10/2009 |
| JP | 2009280029 | 12/2009 |
| JP | 2010-234913 | 10/2010 |

OTHER PUBLICATIONS

Supplementary European Search Report dated Oct. 15, 2014, Application No. EP 12 79 3627, 2 pages.

* cited by examiner

TWO-WHEELED MOTOR VEHICLE

TECHNICAL FIELD

The present invention relates to a two-wheeled motor vehicle in which a rear cushion unit including a damper cylinder having one end part linked to a swing arm that axially supports a rear wheel by a rear end part and is swingably supported on a vehicle body frame, a sub-tank that is connected to the damper cylinder so as to enable hydraulic oil to flow between the sub-tank and the damper cylinder, and an adjustment mechanism that has an operation element and is disposed between the damper cylinder and the sub-tank so as to adjust a damping force in response to an operation of the operation element is provided between the vehicle body frame and the swing arm.

BACKGROUND ART

A two-wheeled motor vehicle equipped with a rear cushion for which damping force characteristics can be adjusted is conventionally known, and there is an arrangement in which a sub-tank, which is a separate body from a damper cylinder, is supported on a linking pipe linking a pair of left and right center pipes forming part of a vehicle body frame, and an adjustment mechanism for adjustment of damping force is attached to the sub-tank (ref. Patent Document 1) or an adjustment mechanism, which is a separate body from a damper cylinder, is mounted on a pillion step holder so as to be spaced from the damper cylinder (ref. Patent Document 2).

RELATED ART DOCUMENTS

Patent Documents

Patent Document 1: Japanese Utility Model Registration Application Laid-open No. 59-19492
Patent Document 2: Japanese Patent Application Laid-open No. 2010-234913

SUMMARY OF INVENTION

Problems to be Solved by the Invention

However, in the arrangements disclosed by Patent Document 1 and Patent Document 2 above, it is necessary to maneuver piping between the damper cylinder and the adjustment mechanism or ensure that there is space for a mounting part of the adjustment mechanism to be mounted on the vehicle body. In order to solve such problems, integrating the damper cylinder and the adjustment mechanism could be considered, but in this case there would be a problem with achieving a balance between having the capability for carrying out an operation of adjusting the adjustment mechanism and having good space efficiency for placement of a rear cushion unit.

The present invention has been accomplished in light of such circumstances, and it is an object thereof to provide a two-wheeled motor vehicle that enables an adjustment mechanism to be disposed with good space efficiency while enabling a damping force to be easily adjusted.

Means for Solving the Problems

In order to attain the above object, according to a first aspect of the present invention, there is provided a two-wheeled motor vehicle in which a rear cushion unit comprising a damper cylinder having one end part linked to a swing arm that axially supports a rear wheel by a rear end part and is swingably supported on a vehicle body frame, a sub-tank that is connected to the damper cylinder so as to enable hydraulic oil to flow between the sub-tank and the damper cylinder, and an adjustment mechanism that has an operation element and is disposed between the damper cylinder and the sub-tank so as to be capable of adjusting a damping force in response to an operation of the operation element is provided between the vehicle body frame and the swing arm, characterized in that a cylinder body of the damper cylinder, a bottomed housing tube part housing the adjustment mechanism having on an upper end part an operation face on which the operation element is disposed, and the sub-tank are integrally and connectedly provided, a pillion step holder is mounted on a seat frame that forms part of the vehicle body frame and is disposed above the swing arm, a pillion step for a foot of a passenger to be placed on being provided on the pillion step holder, and the operation face is disposed so as to be inclined obliquely upward so that the operation element that faces a region bounded by the seat frame, the pillion step holder and the swing arm when viewed from the side can be operated from obliquely above on the outside.

Further, according to a second aspect of the present invention, in addition to the first aspect, the adjustment mechanism comprises at least a first operation element for adjusting a damping force on the compression side of the damper cylinder and a second operation element for adjusting a damping force on the extension side of the damper cylinder, and the operation elements are disposed so as to face the region and be operable from obliquely above on the outside.

According to a third aspect of the present invention, in addition to the first aspect, the swing arm comprises a pair of arm parts that are disposed on opposite left and right sides of the rear wheel and are linked to each other, a bracket is provided integrally with the arm parts so as to protrude above the arm parts when viewed from the side, an upper end of the damper cylinder being mounted on the bracket, and the operation element is disposed to the rear of the bracket and below the upper end of the bracket.

According to a fourth aspect of the present invention, in addition to the first aspect, an inclined part that is inclined upwardly to the rear from a lower end of the bracket is formed at an upper end of one of the two arm parts in a portion positioned to the rear of the bracket, and the operation element is disposed so as to face a recess formed between a lower part of the bracket and the inclined part when viewed from the side.

According to a fifth aspect of the present invention, in addition to the first aspect, a rear fender is disposed above the swing arm and between a pair of left and right seat frames, and a housing recess is formed in a lower face of the rear fender, the housing recess housing an upper part of the damper cylinder, the operation element and the sub-tank when the swing arm is completely flexed.

According to a sixth aspect of the present invention, in addition to the fifth aspect, an anti-lock brake control module is disposed within the rear fender to the rear of the housing recess.

According to a seventh aspect of the present invention, in addition to the first aspect, the housing tube part is disposed so as to have an axis inclined relative to an axis of the damper cylinder, which extends in the vertical direction, while an opening part at an upper end of the housing tube part faces obliquely outward, and the adjustment mechanism is housed within the housing tube part so that the operation face is positioned in the opening part, the operation element being disposed on the operation face.

According to an eighth aspect of the present invention, in addition to the first aspect, a side stand is supported on one of right and left sides of the vehicle body frame, and the operation element is disposed on the side stand side in an inclined manner.

According to a ninth aspect of the present invention, in addition to the first aspect, the swing arm integrally comprises a pair of arm parts disposed on opposite left and right sides of the rear wheel and a cross member part linking front parts of the arm parts, a groove part extending in the fore-and-aft direction is formed in an upper face of a central part of the cross member part in the vehicle width direction, and part of the sub-tank, an upper end part of the damper cylinder and the operation element are disposed within the width of the groove part when viewed from the rear.

According to a tenth aspect of the present invention, in addition to the first aspect, an operation jig for operating the operation element comprises a grip portion for an operator to grip and an operation portion connected to the grip portion at an angle so as to exert an operating force on the operation element.

Furthermore, according to an eleventh aspect of the present invention, in addition to the first aspect, an upper half of the sub-tank disposed so as to extend in the fore-and-aft direction is subjected to a buffing treatment.

An upper bracket 74 of an embodiment corresponds to the bracket of the present invention.

Effects of the Invention

In accordance with the first aspect of the present invention, since the cylinder body of the damper cylinder, the bottomed housing tube part housing the adjustment mechanism, and the sub-tank are integrally and connectedly provided, it is unnecessary to employ a mounting member exclusively used for mounting the adjustment mechanism on the vehicle body, and the rear cushion unit can be provided in a compact manner. Moreover, since in order to enable the operation element of the adjustment mechanism disposed so as to face the region bounded by the seat frame, the pillion step holder, and the swing arm when viewed from the side to be operated from obliquely above on the outside, the operation face, on which the operation element is disposed, is disposed so as to be inclined obliquely upward, it is possible to dispose the adjustment mechanism with good space efficiency and in a manner such that it can be easily operated from the outside.

Furthermore, in accordance with the second aspect of the present invention, since the adjustment mechanism is disposed so as to face the region bounded by the seat frame, the pillion step holder, and the swing arm when viewed from the side and has at least first and second operation elements that can be operated from obliquely above on the outside, the damping force on the compression side of the damper cylinder can be adjusted by the first operation element, and the damping force on the extension side of the damper cylinder can be adjusted by the second operation element, it is possible to easily adjust at least the damping force on the compression side and the damping force on the extension side via one position of the adjustment mechanism.

In accordance with the third aspect of the present invention, since the bracket for mounting the upper end of the damper cylinder is provided integrally with the pair of arm parts of the swing arm so as to protrude above the arm parts when viewed from the side, and the operation element is disposed to the rear of the bracket and below the upper end of the bracket, it is possible to easily ensure that there is space for disposing the operation element in the vicinity of the swing arm, thus enabling the operation element to be disposed with good space efficiency.

In accordance with the fourth aspect of the present invention, since the inclined part, which is inclined upwardly to the rear from the lower end of the bracket, is formed at the upper end of one of the parts so as to faun the recess between the inclined part and the lower parts of the bracket when viewed from the side, and the operation element is disposed so as to face the recess, it is possible to dispose the operation element with better space efficiency while ensuring the stiffness of the swing arm.

In accordance with the fifth aspect of the present invention, since the housing recess is formed on the lower face of the rear fender disposed between the pair of left and right seat frames above the swing arm, and the upper part of the damper cylinder, the operation element, and the sub-tank are housed in the housing recess when the swing arm is completely flexed, it is possible to dispose the rear fender and the rear cushion unit with good space efficiency relative to each other while ensuring the function of the rear fender, thus protecting the rear cushion unit.

In accordance with the sixth aspect of the present invention, housing the anti-lock brake control module within the rear fender to the rear of the housing recess enables the anti-lock brake control module to be disposed with good efficiency and good weight balance at a position where the anti-lock brake control module does not interfere with the rear cushion unit even at a time of complete flexing, while exploiting placement of the rear cushion unit with good space efficiency.

In accordance with the seventh aspect of the present invention, since the housing tube part housing the adjustment mechanism is disposed so as to have an axis inclined relative to the axis of the damper cylinder extending in the vertical direction so as to make the opening part at the upper end face obliquely outward, and the operation face, on which the operation element is disposed, is disposed on the opening part of the housing tube part, it is possible to operate the operation element from the side of the two-wheeled motor vehicle while avoiding any increase in the width, in the vehicle width direction, of the rear cushion unit.

In accordance with the eighth aspect of the present invention, since the operation element is inclined toward the side stand, it becomes easier to operate the operation element due to the vehicle body being inclined in a state in which the vehicle is stopped while resting on the side stand.

In accordance with the ninth aspect of the present invention, since the swing arm integrally includes the pair of arm parts and the cross member part linking the front parts of the arm parts, and part of the sub-tank, the upper end part of the damper cylinder, and the operation element are disposed, when viewed from the rear, within the width of the groove part formed in the upper face of the central part, in the vehicle width direction, of the cross member part and extending in the fore-and-aft direction, it is possible to dispose the rear cushion unit in a compact manner so as to protect it by means of the swing arm while ensuring the stiffness of the swing arm.

In accordance with the tenth aspect of the present invention, since the operation jig includes the grip portion and the operation portion connected to the grip portion at an angle, and an operating force is applied from the operation portion to the operation element, it becomes easier to operate the operation element, which can be operated from obliquely above.

Moreover, in accordance with the eleventh aspect of the present invention, since the sub-tank is disposed so as to extend in the fore-and-aft direction, and the upper half of the sub-tank is subjected to a buffing treatment, it is possible to improve the appearance of a portion exposed to the outside of the sub-tank while enhancing the cost efficiency compared with a case in which the entire outer periphery is subjected to buffing.

EXPLANATION OF REFERENCE NUMERALS AND SYMBOLS

16 Seat frame
24 Swing arm
28 Rear cushion unit
35 Pillion step holder
36 Pillion step
46 Rear fender
47 Side stand
51, 52 Arm part
53 Cross member part
61 Damper cylinder
62 Sub-tank
63 Adjustment mechanism
64 First operation element
65 Second operation element
74 Upper bracket, which is a bracket
76 Housing tube part
77 Opening part
78 Operation face
98 Inclined part
99 Recess
100 Housing recess
101 Anti-lock brake control module
102 Groove part
107 Operation jig
107a Grip portion
107b Operation portion
A Region
F Vehicle body frame
WR Rear wheel Mode for Carrying Out the Invention A mode for carrying out the present invention is explained by reference to the attached FIG. 1 to FIG. 9. In the explanation below, the vertical direction, the fore-and-aft direction, and the left-and-right direction are directions from the viewpoint of a rider.

First Embodiment

Figure 1:
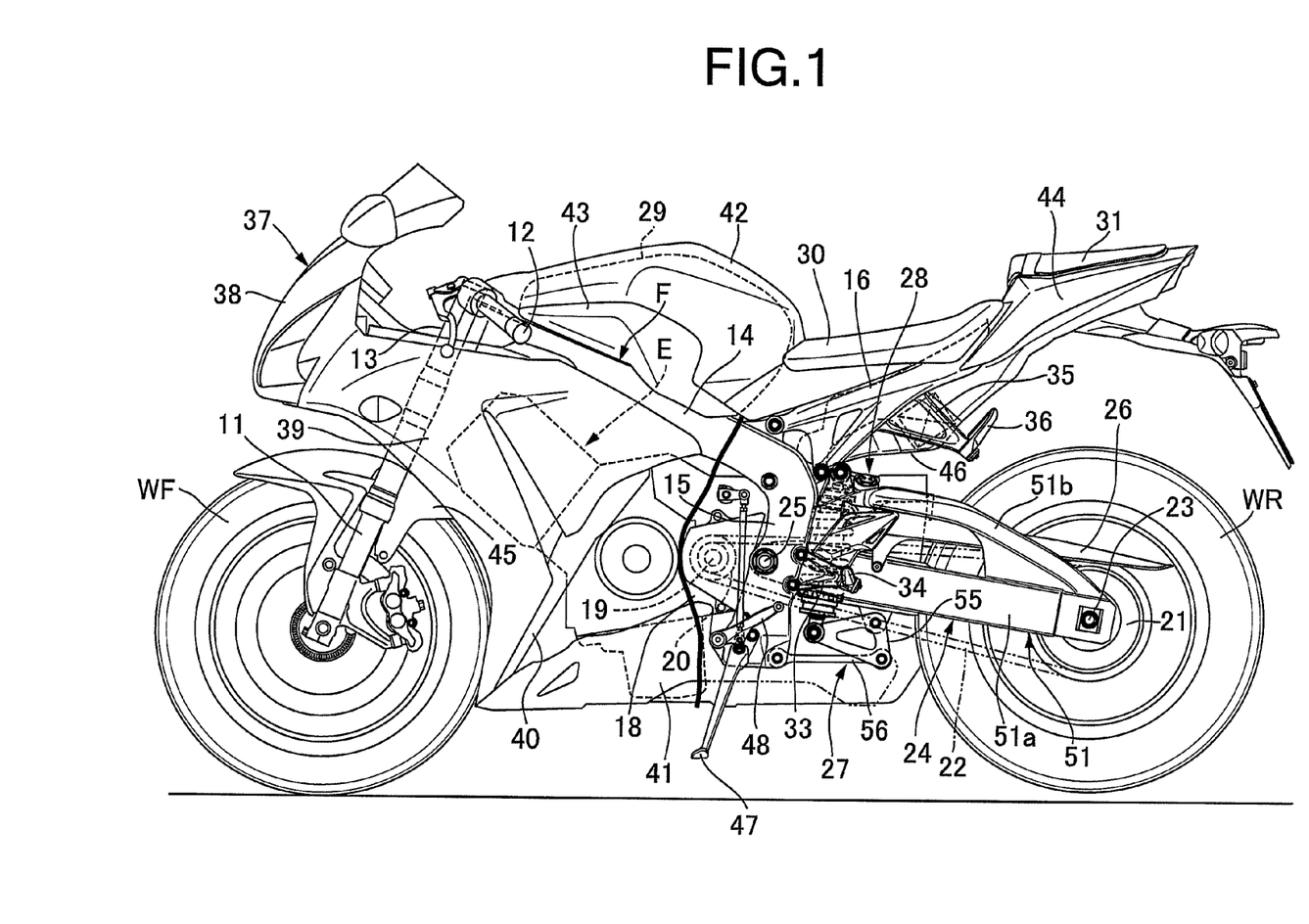
FIG. 1 is a right side view of a two-wheeled motor vehicle. (first embodiment)

First, in FIG. 1, a vehicle body frame F of this two-wheeled motor vehicle includes a head pipe 13 that steerably supports handlebars 12 and a front fork 11 axially supporting a front wheel WF, a pair of left and right main frames 14 that extend downward to the rear from the head pipe 13, pivot frames 15 that are formed integrally with the respective main frames 14 so as to extend downward from the rear end of the main frames 14, and a pair of left and right seat frames 16 that are linked to the rear ends of the main frames 14 and extend upward to the rear.

An engine E is mounted on the vehicle body frame F so as to be disposed beneath the main frames 14 between the front wheel WF and a rear wheel WR. An output shaft 19 of a transmission (not illustrated) housed within a crankcase 18 of the engine E projects leftward from the crankcase 18. An endless chain 22 is wound around a drive sprocket 20 and a driven sprocket 21, the drive sprocket 20 being fixedly provided on an end part, projecting from the crankcase 18, of the output shaft 19, and the driven sprocket 21 being fixedly provided on an axle 23 of the rear wheel WR.

Furthermore, a front end part of a swing arm 24 is vertically swingably supported on the pivot frames 15 of the vehicle body frame F via a support shaft 25, the swing arm 24 axially supporting via its rear end part the axle 23 of the rear wheel WR. A chain cover 26 is mounted on the swing arm 24, the chain cover 26 covering from above part of a traveling portion of the chain 22 from the driven sprocket 21 toward the drive sprocket 20 side.

Moreover, a linking mechanism 27 is provided between the swing arm 24 and the pivot frames 15, and a rear cushion unit 28 is provided between the linking mechanism 27 and the swing arm 24.

A fuel tank 29 positioned above an engine main body 17 is mounted on the main frames 14 of the vehicle body frame F. A rider's seat 30 positioned to the rear of the fuel tank 29 and a pillion seat 31 positioned to the rear of the rider's seat 30 are supported by the seat frames 16.

Figure 2:
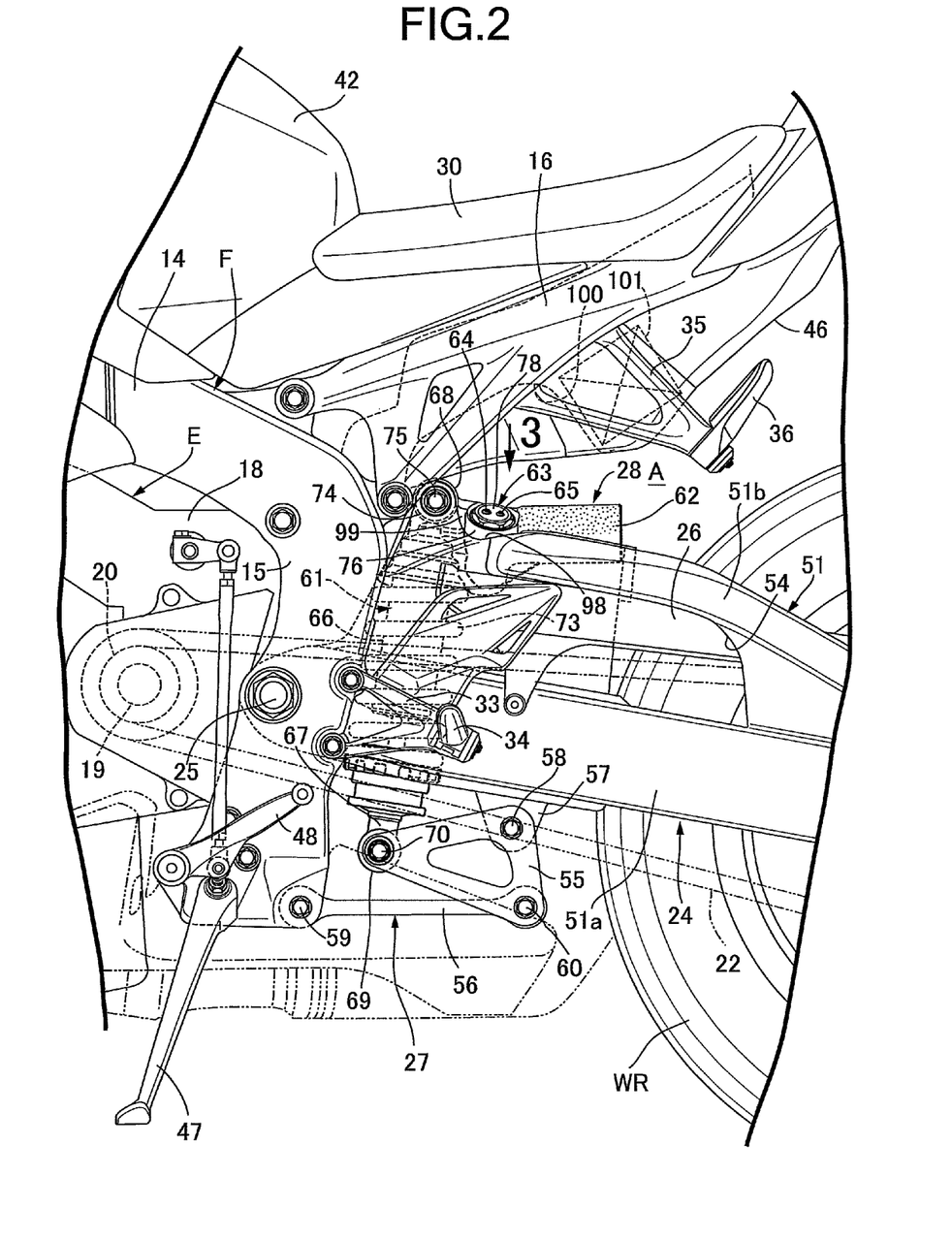
FIG. 2 is an enlarged view of an essential part of FIG. 1. (first embodiment)

Referring in addition to FIG. 2, step holders 33 extending rearward are supported on the pivot frames 15 to the rear of the support shaft 25, and steps 34 are provided on a rear part of the step holders 33, a rider seated on the rider's seat 30 placing his/her feet on the steps 34. Furthermore, pillion step holders 35 extending downward to the rear are each supported on intermediate parts in the fore-and-aft direction of the seat frames 16, and pillion steps 36 are provided on rear parts of the pillion step holders 35, a passenger seated on the pillion seat 31 placing his/her feet on the pillion steps 36.

Parts of the vehicle body frame F and the engine E are covered by a vehicle body cover 37, which is made of a synthetic resin. This vehicle body cover 37 has an upper cowl 38 that covers the head pipe 13 from the front, a pair of left and right outer cowls 39 that are connectedly provided on the upper cowl 38 and cover a front part of the engine E from the side, a pair of left and right layer cowls 40 that are connectedly provided at lower edges of the respective outer cowls 39, a pair of left and right under cowls 41 that cover the engine E from beneath, a tank cover 42 that covers the fuel tank 29, a pair of left and right knee covers 43 that are provided between the tank cover 42 and the main frames 14, and a pair of left and right tail cowls 44 that cover rear parts of the seat frames 16 from the side.

A front fender 45 covering the front wheel WF from above is supported on the front fork 11, and a rear fender 46 disposed above the swing arm 24 and between the pair of left and right seat frames 16 is supported on a rear part of the vehicle body frame F.

Furthermore, a side stand 47 and a shift pedal 48 are pivotably disposed on a lower part of the left pivot frame 15 in the vehicle body frame F, the side stand 47 being capable of pivoting between a raised position (position shown in FIG. 2) in which the two-wheeled motor vehicle is tilted leftward and stopped and a stored position in which travel of the two-wheeled motor vehicle is possible, and the shift pedal 48 being for changing the gear position of the transmission within the crankcase 18.

Figure 3:
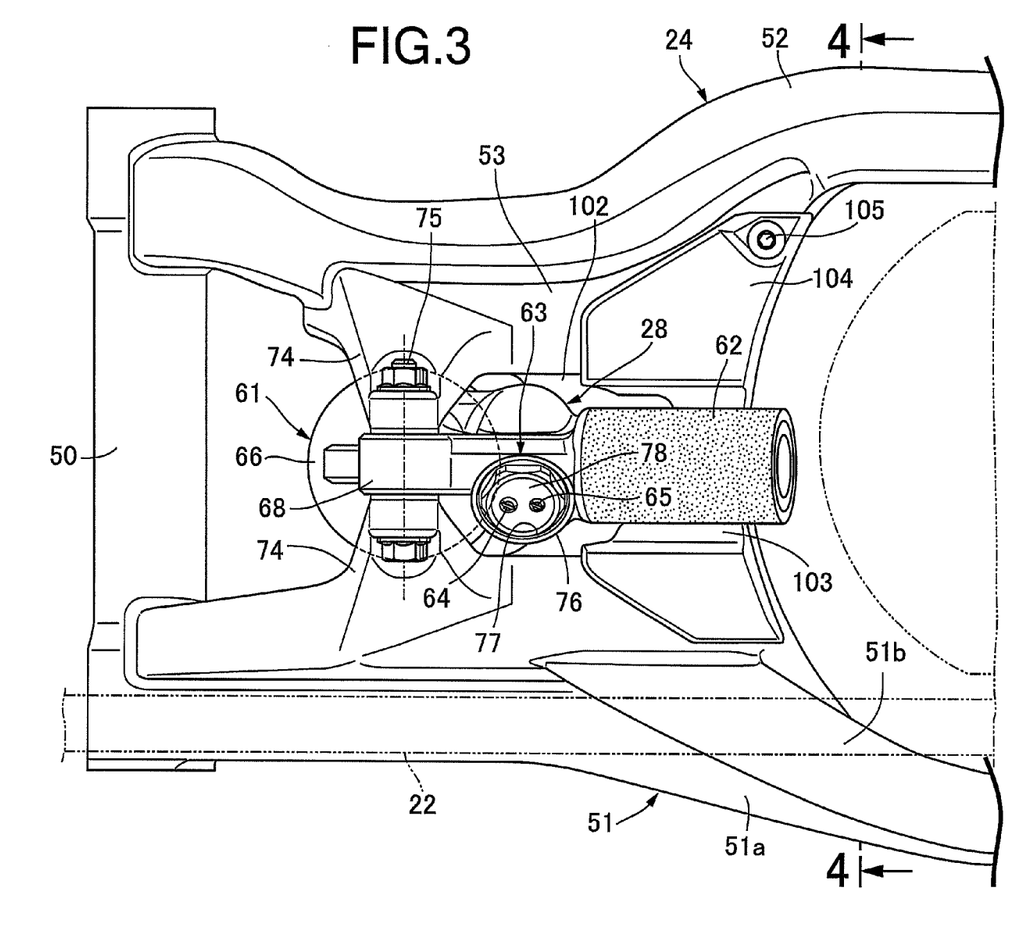
FIG. 3 is a view in the direction of arrow 3 in FIG. 2 in a state in which a chain cover is omitted. (first embodiment)
Figure 4:
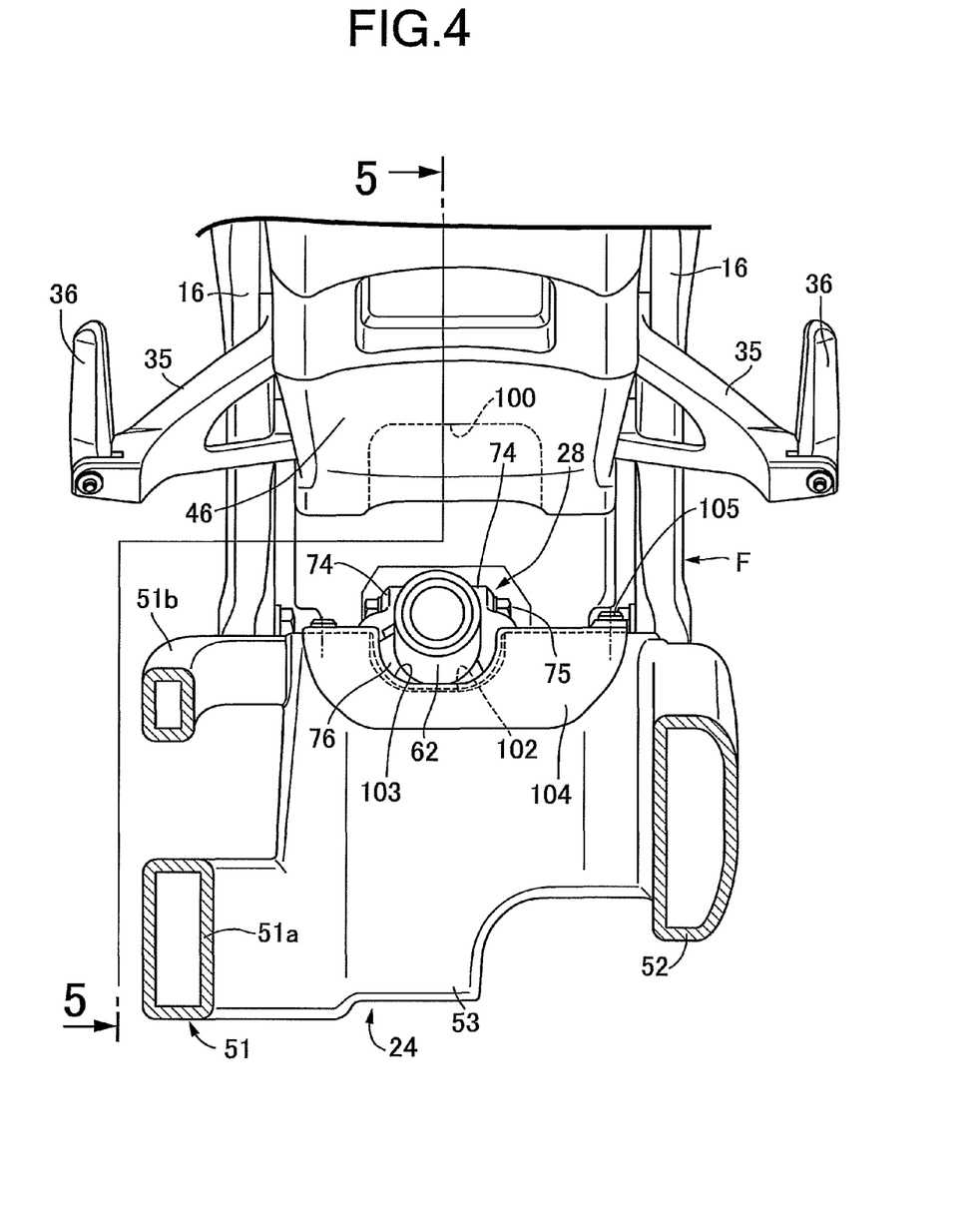
FIG. 4 is a sectional view along line 4-4 in FIG. 3. (first embodiment)
Figure 5:
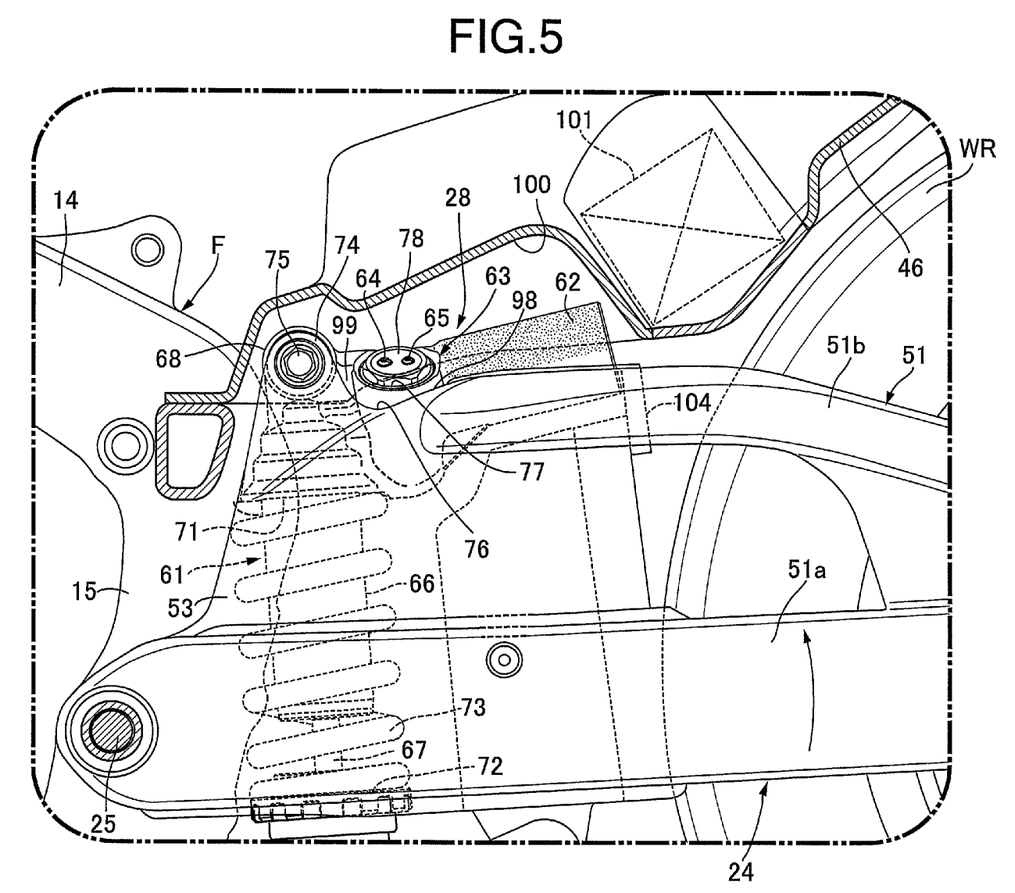
FIG. 5 is a sectional view along line 5-5 in FIG. 4 in a state in which a swing arm is completely flexed. (first embodiment)

Referring in addition to FIG. 3 to FIG. 5, the swing arm 24 includes a pivot pipe 50 that surrounds the support shaft 25 and is pivotably supported on the support shaft 25, a left arm part 51 and a right arm part 52 that have front end parts joined to opposite end parts of the pivot pipe 50, are disposed on opposite left and right sides of the rear wheel WR, and extend in the fore-and-aft direction, and a cross member part 53 that is disposed between the rear wheel WR and the pivot pipe 50 and integrally links the left arm part 51 and the right arm part 52.

The left arm part 51 is formed from a left arm part main body 51a that extends in the fore-and-aft direction along a straight line joining the axis of the support shaft 25 and the axis of the axle 23 of the rear wheel WR, and a sub arm 51a that joins a rear end part of the left arm part main body 51a and a left upper part of the cross member part 53. The cross member part 53 is formed so as to protrude above a front part upper face of the left arm part main body 51a, and the sub arm 51b is disposed above the left arm part main body 51a so as to form, between itself and the left arm part main body 51a, an opening part 54 for travel of the chain 22. The chain cover 26 is secured to the left arm part main body 51a so as to extend through the opening part 54.

The linking mechanism 27, which is provided between the swing arm 24 and the pivot frames 15, includes a linking arm 55 that forms a substantially triangular shape when viewed from the side and a linking rod 56 that extends along substantially the fore-and-aft direction. A lower bracket 57 is provided on a lower face of a front part of the left arm part main body 51a of the left arm part 51 and a lower face of a front part of the right arm part 52 of the swing arm 24. An upper end part of the linking arm 55 is linked to the lower bracket 57 via a first linking shaft 58, which is parallel to the support shaft 25. Furthermore, a front end part of the linking rod 56 is linked to a lower part of the pivot frames 15 in the vehicle body frame F via a second linking shaft 59, which is parallel to the support shaft 25. A rear end part of the linking rod 56 is linked to a rear end part of the linking arm 55 via a third linking shaft 60, which is parallel to the support shaft 25.

Figure 6:
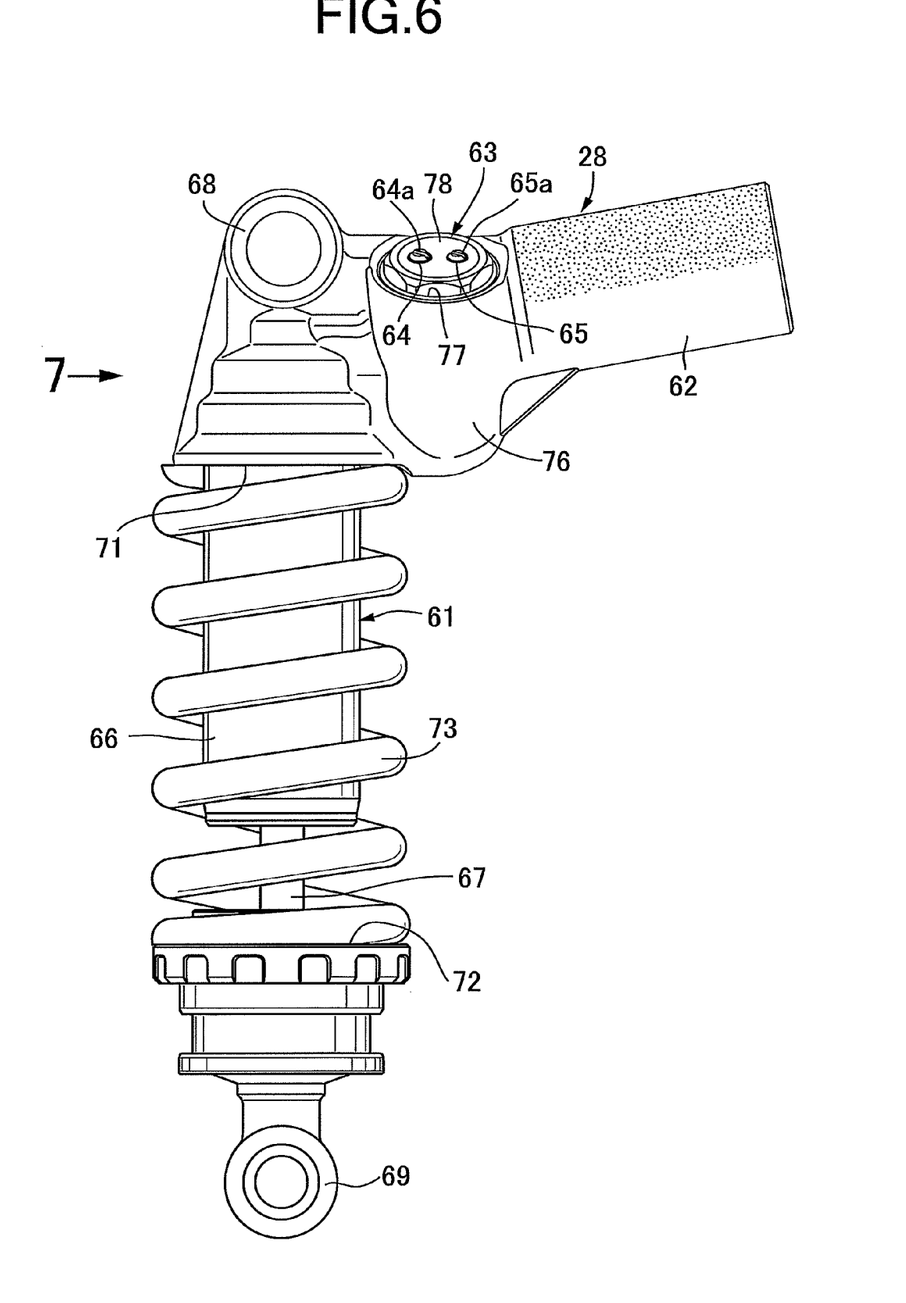
FIG. 6 is a side view of a rear cushion unit from the same direction as in FIG. 2. (first embodiment)
Figure 7:
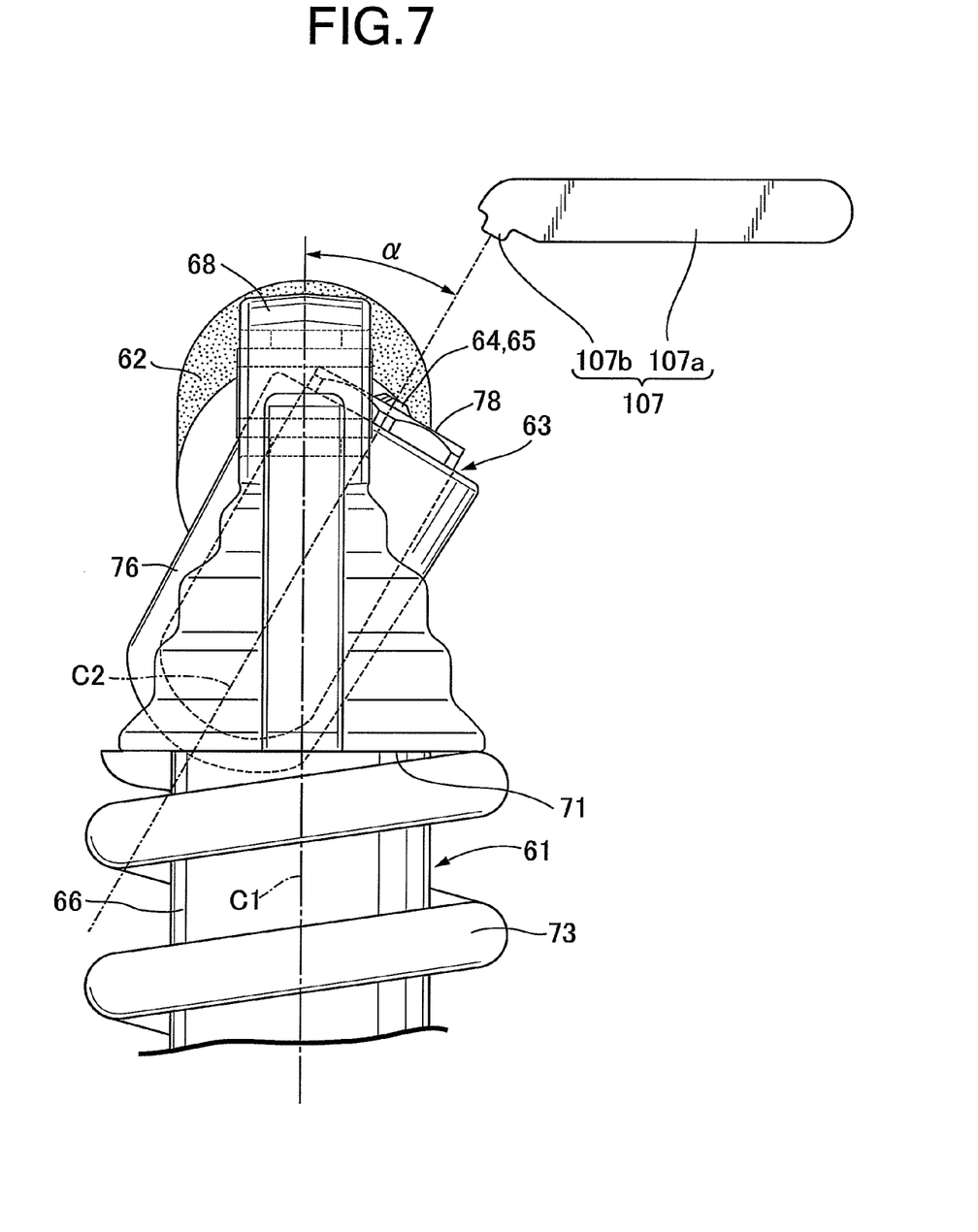
FIG. 7 is a view in the direction of arrow 7 in FIG. 6. (first embodiment)

Referring in addition to FIG. 6 and FIG. 7, the rear cushion unit 28 includes a damper cylinder 61, a sub-tank 62 that is connected to the damper cylinder 61 such that hydraulic oil can flow between itself and the damper cylinder 61, and an adjustment mechanism 63 that is disposed between the damper cylinder 61 and the sub-tank 62, the adjustment mechanism 63 having at least two operation elements, that is, first and second operation elements 64 and 65 in this embodiment, and the damping force being adjusted in response to operation of these operation elements 64 and 65.

The damper cylinder 61 includes a cylinder body 66 that extends in the vertical direction and a piston rod 67 that extends liquid-tightly through a lower end part of the cylinder body 66 and protrudes downward from the cylinder body 66. An upper mounting part 68 is provided integrally with one end part (an upper end part in this embodiment) of the cylinder body 66. On the other hand, a lower mounting part 69 is provided on an extremity part, that is, a lower end part, of the piston rod 67. This lower mounting part 69 is linked to a front end part of the linking arm 55 in the linking mechanism 27 via a fourth linking shaft 70, which is parallel to the support shaft 25.

Furthermore, a coil spring 73 surrounding the cylinder body 66 and the piston rod 67 is provided in a compressed state between an upper spring receiving part 71 provided on an upper part of the cylinder body 66 and a lower spring receiving part 72 provided on a lower part of the piston rod 67, the coil spring 73 applying an initial load to the damper cylinder 61.

On the other hand, of the left arm part 51 and right arm part 52 of the swing arm 24, portions positioned in front of the lower bracket 57 are provided integrally with upper brackets 74 and 74 protruding above the arm parts 51 and 52. The upper mounting part 68 at the upper end of the cylinder body 66 is linked to the upper brackets 74 via a fifth linking shaft 75, which is parallel to the support shaft 25.

Integrally and connectedly provided on the cylinder body 66 is a bottomed housing tube part 76 that houses the adjustment mechanism 63, which has in an upper end part an operation face 78 having the first and second operation elements 64 and 65 disposed thereon, and that is disposed to the rear of the cylinder body 66. The sub-tank 62 extending in the fore-and-aft direction to the rear of the housing tube part 76 is integrally and connectedly provided on the housing tube part 76. That is, the cylinder body 66, the housing tube part 76, and the sub-tank 62 are integrally and connectedly provided. Moreover, an upper half of the sub-tank 62 extending in the fore-and-aft direction is subjected to a buffing treatment as shown by dots in FIG. 2, FIG. 3, and FIG. 5 to FIG. 7.

The housing tube part 76 is disposed so as to have an axis C2 that is tilted leftward only by an angle α (for example 30 degrees) relative to an axis C1 of the damper cylinder 61 extending in the vertical direction such that the opening part 77 at the upper end faces obliquely outward. The adjustment mechanism 63 is housed within the housing tube part 76 so that the operation face 78 having the first and second operation elements 64 and 65 disposed thereon is provided in the opening part 77, and the operation face 78 is disposed so as to be inclined facing obliquely upwardly to the outside on the left-hand side.

Thus, the axis C2 of the housing tube part 76 is disposed so as to be inclined leftward, that is, toward the side stand 47, which is disposed in the lower part of the left pivot frame 15 of the vehicle body frame F, and the first and second operation elements 64 and 65 disposed on the operation face 78 disposed in the opening part 77 at the upper end of the housing tube part 76 can thereby be operated from obliquely above on the outside on the left-hand side.

Figure 8:
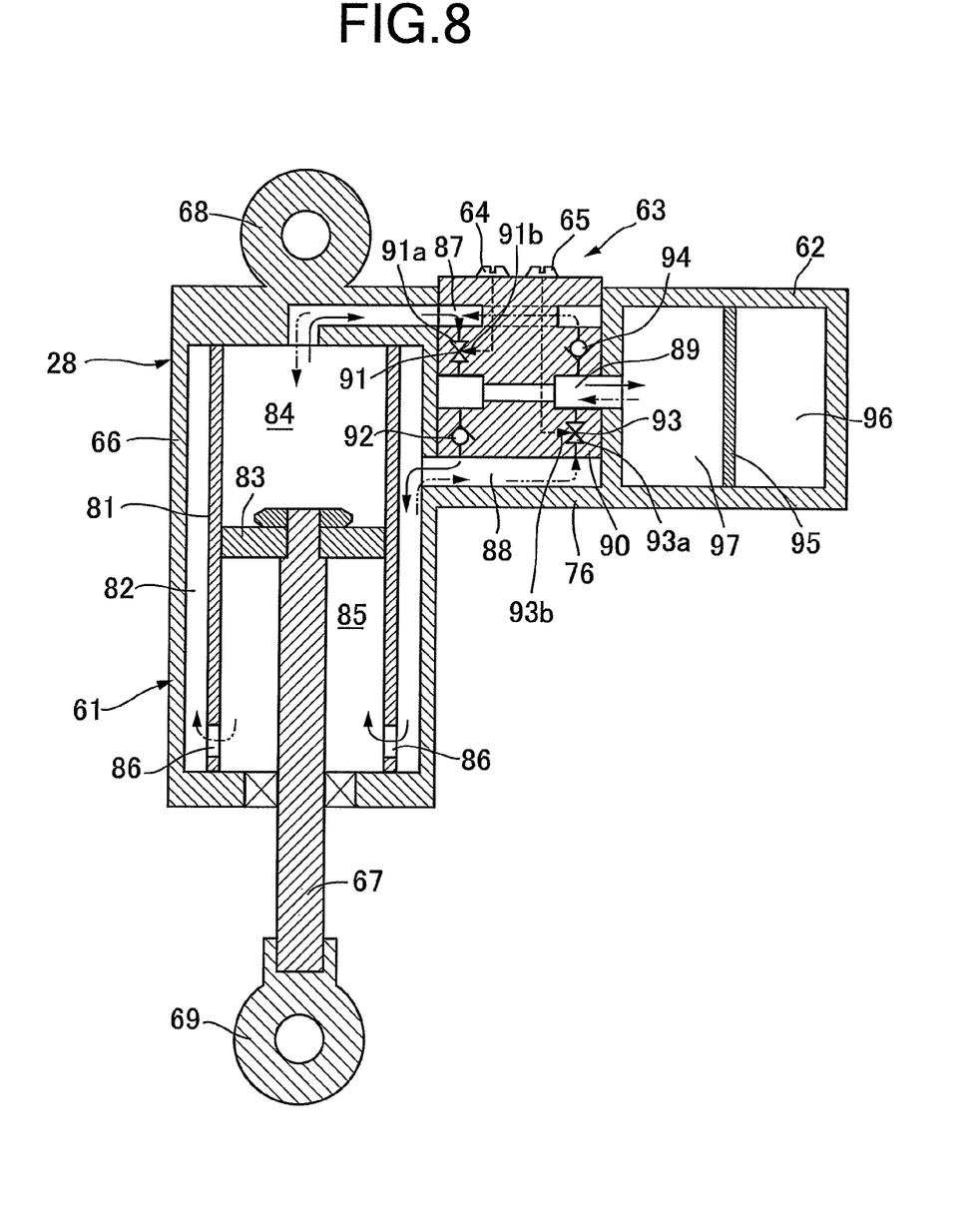
FIG. 8 is a schematic sectional view for explaining the basic structure of the rear cushion unit. (first embodiment)

In FIG. 8, an inner tube 81 is coaxially inserted and fixed within the cylinder body 66, the inner tube 81 forming an annular outer flow path 82 between itself and the inner periphery of the cylinder body 66. A piston 83 fixed to the piston rod 67 is slideably fitted into the inner tube 81, and a piston-side oil chamber 84 and a rod-side oil chamber 85 separated from each other via the piston 83 are formed within the inner tube 81. A plurality of communication holes 86 via which the outer flow path 82 communicates with the rod-side oil chamber 85 are provided in the inner tube 81.

The adjustment mechanism 63 is formed by providing a compression-side damping force adjustment valve 91, a compression-side check valve 92, an extension-side damping force adjustment valve 93, and an extension-side check valve 94 in a holder 90. The holder 90 is housed within the housing tube part 76 while faulting, between itself and the housing tube part 76, an annular first extension-compression common flow path 87 communicating with the piston-side oil chamber 84, a second extension-compression common flow path 88 communicating with the outer flow path 82 connected to the rod-side oil chamber 85 via the communication holes 86, and an annular third extension-compression common flow path 89 connected to the sub-tank 62. The compression-side damping force adjustment valve 91 is disposed between the first and third extension-compression common flow paths 87 and 89. The compression-side check valve 92 is disposed between the second and third extension-compression common flow paths 88 and 89 while allowing flow only from the third extension-compression common flow path 89 toward the second extension-compression common flow path 88. The extension-side damping force adjustment valve 93 is disposed between the second and third extension-compression common flow paths 88 and 89. The extension-side check valve 94 is disposed between the first and third extension-compression common flow paths 87 and 89 while allowing flow only from the third extension-compression common flow path 89 toward the first extension-compression common flow path 87.

The interior of the sub-tank 62 is divided into an air chamber 96 and an oil-retaining chamber 97 by means of a bladder 95, and the third extension-compression common flow path 89 of the adjustment mechanism 63 communicates with the oil-retaining chamber 97.

In such a rear cushion unit 28, during the compression-side stroke of the damper cylinder 61, hydraulic oil flows as shown by the solid line arrows in FIG. 8. Due to hydraulic oil of the piston-side oil chamber 84, whose oil pressure has increased, flowing from the first extension-compression common flow path 87 of the adjustment mechanism 63 to the third extension-compression common flow path 89 via the compression-side damping force adjustment valve 91, a compression-side damping force is generated. Hydraulic oil from the compression-side damping force adjustment valve 91 is divided into two by means of the third extension-compression common flow path 89, some hydraulic oil flows from the compression-side check valve 92 to the rod-side oil chamber 85 via the second extension-compression common flow path 88, the outer flow path 82, and the communication holes 86, and the remaining hydraulic oil flows into the oil-retaining chamber 97 within the sub-tank 62.

Furthermore, during the extension side stroke of the damper cylinder 61, hydraulic oil flows as shown by the chain line arrows in FIG. 8. Due to hydraulic oil of the rod-side oil chamber 85, whose oil pressure has increased, flowing to the second extension-compression common flow path 88 of the adjustment mechanism 63 via the communication holes 86 and the outer flow path 82 and from the second extension-compression common flow path 88 to the third extension-compression common flow path 89 via the extension-side damping force adjustment valve 93, an extension-side damping force is generated. In the third extension-compression common flow path 89, hydraulic oil from the extension-side damping force adjustment valve 93 and hydraulic oil from the oil-retaining chamber 97 of the sub-tank 62 are combined and flow from the extension-side check valve 94 to the piston-side oil chamber 84 via the first extension-compression common flow path 87.

The compression-side damping force adjustment valve 91 and the extension-side damping force adjustment valve 93 in the adjustment mechanism 63 are fanned from damping force-generating valves 91a and 93a that generate a damping force and variable orifices 91a and 93b that enable the operation elements 64 and 65 to freely adjust the damping force. The first operation element 64 can adjust the degree of opening of the variable orifice 91b of the compression-side damping force adjustment valve 91, that is, the damping force on the compression side of the damper cylinder 61. The second operation element 65 can adjust the degree of opening of the variable orifice 93b of the extension-side damping force adjustment valve 93, that is, the damping force on the extension side of the damper cylinder 61.

Referring again to FIG. 2, the first and second operation elements 64 and 65 of the adjustment mechanism 63 are disposed so as to face a region A bounded by the left seat frame 16 forming part of the vehicle body frame F, the pillion step holder 35 mounted on the seat frame 16, and the swing arm 24 when the two-wheeled motor vehicle is viewed from the left-hand side, and the operation face 78 is disposed so as to be inclined obliquely upward to the outside on the left-hand side, therefore making it possible to operate the first and second operation elements 64 and 65, which face the region A, from obliquely above on the outside on the left-hand side.

Furthermore, as clearly shown in FIG. 2 and FIG. 5, the first and second operation elements 64 and 65 are disposed to the rear of the upper bracket 74 provided integrally with the arm parts 51 and 52 of the swing arm 24, and beneath the upper end of the upper bracket 74.

Moreover, as shown in FIG. 5, an inclined part 98 is formed at the upper end of the sub arm 51b in the left arm part 51, which is one of the pair of left and right arm parts 51 and 52 of the swing arm 24, in a portion positioned to the rear of the upper bracket 74, the inclined part 98 being inclined upwardly to the rear from the lower end of the upper bracket 74. The first and second operation elements 64 and 65 are disposed so as to face a recess 99 formed between the lower part of the upper bracket 74 and the inclined part 98 when viewed from the side.

The rear fender 46 is disposed above the swing arm 24 and between the pair of left and right seat frames 16, and a housing recess 100 is formed in a lower face of the rear fender 46 as shown in FIG. 5, the housing recess 100 housing the upper part of the damper cylinder 61, the upper part of the adjustment mechanism 63 including the first and second operation elements 64 and 65, and the sub-tank 62 when the swing arm 24 is completely flexed.

Furthermore, an anti-lock brake control module 101 is disposed within the rear fender 46 to the rear of the housing recess 100.

A groove part 102 extending in the fore-and-aft direction is formed in an upper face of a central part in the vehicle width direction of the cross member part 53 provided integrally with the swing arm 24. When viewed from the rear as shown in FIG. 4, part of the sub-tank 62, an upper end part of the damper cylinder 61, and an upper end part of the adjustment mechanism 63 including the first and second operation elements 64 and 65 are disposed within the width of the groove part 102.

Furthermore, a cover 104 having a groove part 103 communicating with the groove part 102 is secured to a rear part of the cross member part 53 by means of a screw member 105 so as to cover, from beneath, a portion of the sub-tank 62 that juts out of the cross member part 53 to the rear.

Figure 9:
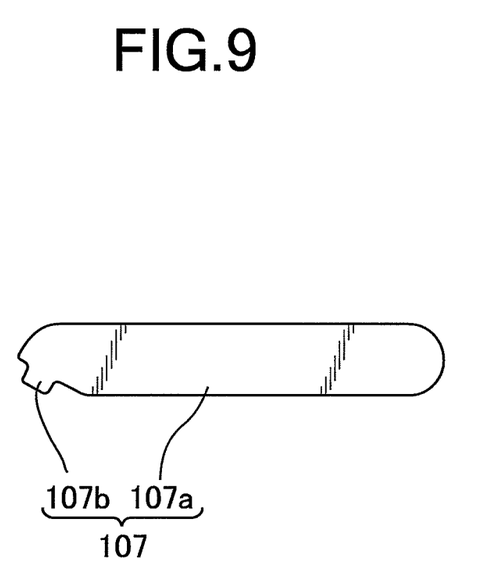
FIG. 9 is a side view of an operation jig. (first embodiment)

In FIG. 9, an operation jig 107 prepared for when operating the first and second operation elements 64 and 65 is formed from a grip portion 107a for an operator to grip and an operation portion 107b connected to the grip portion 107a through an angle so as to exert an operating force on the first and second operation elements 64 and 65. The operation portion 107b can engage with latching grooves 64a and 65a (see FIG. 6) provided in the first and second operation elements 64 and 65 respectively.

The operation of this embodiment is now explained. Since the cylinder body 66 of the damper cylinder 61 in the rear cushion unit 28, the bottomed housing tube part 76 housing the adjustment mechanism 63, and the sub-tank 62 are integrally and connectedly provided, it is unnecessary to employ a mounting member exclusively used for mounting the adjustment mechanism 63 on the vehicle body, and the rear cushion unit 28 can be disposed in a compact manner.

Furthermore, the pillion step holders 35 having provided thereon the pillion steps 36 for a passenger to place his/her feet on are mounted on the seat frames 16 disposed above the swing arm 24, the first and second operation elements 64 and 65 of the adjustment mechanism 63 are disposed so as to face the region A bounded by the seat frame 16, the pillion step holder 35, and the swing arm 24 when viewed from the left-hand side of the two-wheeled motor vehicle, and the operation face 78 having the first and second operation elements 64 and 65 disposed thereon is disposed so as to be inclined obliquely upward such that the first and second operation elements 64 and 65 can be operated from obliquely above on the outside, therefore making it possible to dispose the adjustment mechanism 63 with good space efficiency while enabling it to be easily operated from the outside.

Moreover, the adjustment mechanism 63 has at least the first operation element 64 for adjusting the damping force on the compression side of the damper cylinder 61 and the second operation element 64 for adjusting the damping force on the extension side of the damper cylinder 61, and these operation elements 64 and 65 are disposed so that they face the region A and can be operated from obliquely above on the outside, therefore making it possible to easily adjust at least the damping force on the compression side and the damping force on the extension side via one position of the adjustment mechanism 63.

Furthermore, the swing arm 24 has the pair of left and right arm parts 51 and 52 disposed on opposite left and right sides of the rear wheel WR and linked to each other, the upper brackets 74 for mounting the upper end of the damper cylinder 61 are provided integrally with the left and right arm parts 51 and 52 so as to protrude above the arm parts 51 and 52 when viewed from the side, and the first and second operation elements 64 and 65 are disposed to the rear of the upper brackets 74 and beneath the upper end of the upper brackets 74, therefore making it possible to easily ensure that there is space for disposing the first and second operation elements 64 and 65 in the vicinity of the swing arm 24 and thus enabling the first and second operation elements 64 and 65 to be disposed with good space efficiency.

Moreover, the inclined part 98, which is inclined upwardly to the rear from the lower end of the upper bracket 74, is formed at the upper end of the sub arm 51b of the left arm part 51, which is one of the left and right arm parts 51 and 52, in a portion positioned to the rear of the upper brackets 74, and the first and second operation elements 64 and 65 are disposed so as to face the recess 99 formed between the lower part of the upper bracket 74 and the inclined part 98 when viewed from the side, therefore making it possible to dispose the first and second operation elements 64 and 65 with better space efficiency while ensuring the stiffness of the swing arm 24.

The rear fender 46 is disposed above the swing arm 24 and between the pair of left and right seat frames 16, and the housing recess 100 housing the upper part of the damper cylinder 61, the first and second operation elements 64 and 65, and the sub-tank 62 when the swing arm 24 is completely flexed is formed in the lower face of the rear fender 46, therefore making it possible to dispose rear fender 46 and the rear cushion unit 28 with good space efficiency relative to each other while ensuring the function of the rear fender 46 and thus protecting the rear cushion unit 28.

Moreover, since the anti-lock brake control module 101 is disposed within the rear fender 46 to the rear of the housing recess 100, it is possible to dispose the anti-lock brake control module 101 with good efficiency and good weight balance at a position where it does not interfere with the rear cushion unit 28 when completely flexed, while exploiting placement of the rear cushion unit 28 with good space efficiency.

The housing tube part 76 housing the adjustment mechanism 63 having the operation face 78 on the upper end part is disposed so as to have the axis C2 tilted leftward relative to the axis C1 of the damper cylinder 61 extending in the vertical direction so as to make the opening part 77 at the upper end face obliquely outward, and the adjustment mechanism 63 is housed within the housing tube part 76 so that the operation face 78 having the first and second operation elements 64 and 65 disposed thereon is placed on the opening part 77, therefore making it possible to operate the first and second operation elements 64 and 65 from the side of the two-wheeled motor vehicle while avoiding any increase in the width of the rear cushion unit 28 in the vehicle width direction.

Furthermore, since the side stand 47 is supported on the left side of the vehicle body frame F, and the first and second operation elements 64 and 65 are disposed so as to be inclined toward the side stand 47 side, it is possible to easily operate the first and second operation elements 64 and 65 due to the vehicle body being inclined in a state in which it is stopped while resting on the side stand 47.

The swing arm 24 integrally has the pair of left and right arm parts 51 and 52 disposed on opposite left and right sides of the rear wheel WR and the cross member part 53 linking the front parts of the arm parts 51 and 52, and part of the sub-tank 62, the upper end part of the damper cylinder 61, and the first and second operation elements 64 and 65 are disposed within the width, when viewed from the rear, of the groove part 102 that is formed in the upper face of the central part, in the vehicle width direction, of the cross member part 53 and extends in the fore-and-aft direction, therefore making it possible to dispose the rear cushion unit 28 in a compact manner so as to protect it by means of the swing arm 24 while ensuring the stiffness of the swing arm 24.

Moreover, the operation jig 107 for operating the first and second operation elements 64 and 65 is formed from the grip portion 107a for an operator to grip and the operation portion 107b connected to the grip portion 107a through an angle so as to exert an operating force on the first and second operation elements 64 and 65, thus making it possible to exert an operating force on the first and second operation elements 64 and 65 from the operation portion 107b in a state in which the grip portion 107a is gripped substantially horizontally as shown in FIG. 7, thereby making easier the operation of the first and second operation elements 64 and 65, which can be operated from obliquely above.

Moreover, since an upper half of the sub-tank 62 disposed so as to extend in the fore-and-aft direction is subjected to a buffing treatment, it is possible to improve the appearance of a portion, exposed to the outside, of the sub-tank 62 while enhancing the cost efficiency compared with a case in which the entire outer periphery is subjected to a buffing treatment.

An embodiment of the present invention is explained above, but the present invention is not limited to the embodiment above and may be modified in a variety of ways as long as the modifications do not depart from the spirit and scope thereof.

The invention claimed is:

1. A two-wheeled motor vehicle in which a rear cushion unit comprising a damper cylinder having one end part linked to a swing arm that axially supports a rear wheel by a rear end part and is swingably supported on a vehicle body frame, a sub-tank that is connected to the damper cylinder so as to enable hydraulic oil to flow between the sub-tank and the damper cylinder, and an adjustment mechanism that has an operation element and is disposed between the damper cylinder and the sub-tank so as to be capable of adjusting a damping force in response to an operation of the operation element is provided between the vehicle body frame and the swing arm, wherein a cylinder body of the damper cylinder, a bottomed housing tube part housing the adjustment mechanism having on an upper end part an operation face on which the operation element is disposed, and the sub-tank are integrally and connectedly provided, a pillion step holder is mounted on a seat frame that forms part of the vehicle body frame and is disposed above the swing arm, a pillion step for a foot of a passenger to be placed on being provided on the pillion step holder, and the operation face is disposed so as to be inclined obliquely upward so that the operation element that faces a region bounded by the seat frame, the pillion step holder and the swing arm when viewed from the side can be operated from obliquely above on the outside,
wherein the adjustment mechanism comprises at least a first operation element for adjusting a damping force on the compression side of the damper cylinder and a second operation element for adjusting a damping force on the extension side of the damper cylinder, and the operation elements are disposed so as to face the region and be operable from obliquely above on the outside.

2. The two-wheeled motor vehicle according to claim 1, wherein a rear fender is disposed above the swing arm and between left and right seat frames, and a housing recess is formed in a lower face of the rear fender, the housing recess housing an upper part of the damper cylinder, the operation element and the sub-tank when the swing arm is completely flexed.

3. The two-wheeled motor vehicle according to claim 2, wherein an anti-lock brake control module is disposed within the rear fender to the rear of the housing recess.

4. The two-wheeled motor vehicle according to claim 1, wherein the housing tube part is disposed so as to have an axis inclined relative to an axis of the damper cylinder, which extends in the vertical direction, while an opening part at an upper end of the housing tube part faces obliquely outward, and the adjustment mechanism is housed within the housing tube part so that the operation face is positioned in the opening part, the operation element being disposed on the operation face.

5. The two-wheeled motor vehicle according to claim 1, wherein a side stand is supported on one of right and left sides of the vehicle body frame, and the operation element is disposed on the side stand side in an inclined manner.

6. The two-wheeled motor vehicle according to claim 1, wherein an operation jig for operating the operation element comprises a grip portion for an operator to grip and an operation portion connected to the grip portion at an angle so as to exert an operating force on the operation element.

7. The two-wheeled motor vehicle according to claim 1, wherein an upper half of the sub-tank disposed so as to extend in the fore-and-aft direction is subjected to a buffing treatment.

8. A two-wheeled motor vehicle in which a rear cushion unit comprising a damper cylinder having one end part linked to a swing arm that axially supports a rear wheel by a rear end part and is swingably supported on a vehicle body frame, a sub-tank that is connected to the damper cylinder so as to enable hydraulic oil to flow between the sub-tank and the damper cylinder, and an adjustment mechanism that has an operation element and is disposed between the damper cylinder and the sub-tank so as to be capable of adjusting a damping force in response to an operation of the operation element is provided between the vehicle body frame and the swing arm, wherein a cylinder body of the damper cylinder, a bottomed housing tube part housing the adjustment mechanism having on an upper end part an operation face on which the operation element is disposed, and the sub-tank are integrally and connectedly provided, a pillion step holder is mounted on a seat frame that forms part of the vehicle body frame and is disposed above the swing arm, a pillion step for a foot of a passenger to be placed on being provided on the pillion step holder, and the operation face is disposed so as to be inclined obliquely upward so that the operation element that faces a region bounded by the seat frame, the pillion step holder and the swing arm when viewed from the side can be operated from obliquely above on the outside,
wherein the swing arm comprises a pair of arm parts that are disposed on opposite left and right sides of the rear wheel and are linked to each other, a bracket is provided integrally with the arm parts so as to protrude above the arm parts when viewed from the side, an upper end of the damper cylinder being mounted on the bracket, and the operation element is disposed to the rear of the bracket and below the upper end of the bracket.

9. The two-wheeled motor vehicle according to claim 8, wherein an inclined part that is inclined upwardly to the rear from a lower end of the bracket is formed at an upper end of one of the two arm parts in a portion positioned to the rear of the bracket, and the operation element is disposed so as to face a recess formed between a lower part of the bracket and the inclined part when viewed from the side.

10. A two-wheeled motor vehicle in which a rear cushion unit comprising a damper cylinder having one end part linked to a swing arm that axially supports a rear wheel by a rear end part and is swingably supported on a vehicle body frame, a sub-tank that is connected to the damper cylinder so as to enable hydraulic oil to flow between the sub-tank and the damper cylinder, and an adjustment mechanism that has an operation element and is disposed between the damper cylinder and the sub-tank so as to be capable of adjusting a damping force in response to an operation of the operation element is provided between the vehicle body frame and the swing arm, wherein a cylinder body of the damper cylinder, a bottomed housing tube part housing the adjustment mechanism having on an upper end part an operation face on which the operation element is disposed, and the sub-tank are integrally and connectedly provided, a pillion step holder is mounted on a seat frame that forms part of the vehicle body frame and is disposed above the swing arm, a pillion step for a foot of a passenger to be placed on being provided on the pillion step holder, and the operation face is disposed so as to be inclined obliquely upward so that the operation element that faces a region bounded by the seat frame, the pillion step holder and the swing arm when viewed from the side can be operated from obliquely above on the outside,
wherein the swing arm integrally comprises a pair of arm parts disposed on opposite left and right sides of the rear wheel and a cross member part linking front parts of the arm parts, a groove part extending in the fore-and-aft direction is formed in an upper face of a central part of the cross member part in the vehicle width direction, and part of the sub-tank, an upper end part of the damper cylinder and the operation element are disposed within the width of the groove part when viewed from the rear.

* * * * *